Patented Oct. 17, 1944

2,360,450

UNITED STATES PATENT OFFICE 2,360,450

METHOD OF TREATING RUBBER AND PRODUCT OBTAINED THEREBY

Robert L. Sibley, Nitro, W. Va., assignor to Monsanto Chemical Company, St. Louis, Mo., a corporation of Delaware No Drawing. Application January 9, 1942, Serial No. 426,240

19 Claims. (Cl. 260—799)

The present invention relates to a method of improving the physical properties of rubber and to the vulcanizates obtained by heating rubber and sulfur in the presence of a new class of treating agents.

In accordance with the present invention it has been discovered that chlor substituted diphenyls retard cracking and checking of rubber articles. It is well known that prolonged flexing of a rubber compound as is encountered for example during the natural wear of a rubber tire, results in a checking and cracking of the rubber which seriously shortens the life and usefulness of the article. The phenomenon of checking apparently is independent of antioxidant activity. In any event the strength of a rubber antioxidant is no criteria of the resistance to flex-cracking imparted to the rubber. Since the antioxidant properties of the chlor diphenyls, if any, are weak, it is preferred to use them in conjunction with the common rubber antioxidants. Surprisingly small amounts are effective. As little as 0.05 part by weight on 100 parts by weight of the rubber exert an appreciable affect but it is preferred to use 0.10 part by weight on the rubber in order to provide an adequate margin of safety. Up to 0.2 part have been employed with somewhat increased effects as the amount is increased. While even higher amounts can be used where desired, there is no further improvement in the flex-cracking resistance. Since the chlor substituted diphenyls are of limited solubility in rubber, the amount incorporated into the rubber must be kept low where a bloom is undesirable. However, where a bloom can be permitted, it is highly advantageous to increase the amount, say up to 3.0 parts by weight, so as to produce on the surface of the rubber a thin flexible uniform layer of chlorinated diphenyl. In this manner the resistance of the rubber to sun-checking can be materially enhanced. The use of chlorinated diphenyls to prevent the checking and cracking of rubber upon exposure to sunlight is disclosed in co-pending application, Serial No. 212,773 filed June 9, 1938, now U. S. Patent No. 2,291,988, of which the present application is a continuation-in-part.

While more than one chlorine substituent may be present on the diphenyl nucleus, the mono chlor substituted diphenyls have been found to be particularly effective.

As specific embodiments of the invention to illustrate the same but without limiting the invention, rubber stocks were compounded comprising:

|  | Stock | | | | | | | |
| --- | --- | --- | --- | --- | --- | --- | --- | --- |
|  | A | B | C | D | E | F | G | H |
|  | Parts by weight | Parts by weight | Parts by weight | Parts by weight | Parts by weight | Parts by weight | Parts by weight | Parts by weight |
| Smoked sheets rubber | 100 | 100 | 100 | 100 | 100 | 100 | 100 | 100 |
| Carbon black | 50 | 50 | 50 | 50 | 50 | 50 | 50 | 50 |
| Zinc oxide | 5 | 5 | 5 | 5 | 5 | 5 | 5 | 5 |
| Sulfur | 3 | 3 | 3 | 3 | 3 | 3 | 3 | 3 |
| Stearic acid | 3 | 3 | 3 | 3 | 3 | 3 | 3 | 3 |
| Pine tar | 2 | 2 | 2 | 2 | 2 | 2 | 2 | 2 |
| Mercaptobenzothiazole | 0.75 | 0.75 | 0.75 | 0.75 | 0.75 | 0.75 | 0.75 | 0.75 |
| Condensation product of p-amino diphenylacetone | 1.0 | 1.0 | 1.0 | 1.1 |  |  |  |  |
| p-Chlor diphenyl |  | .05 | .1 |  |  | 0.5 | 0.1 |  |
| Mineral acid rearranged 2,2,4-trimethyl dihydroquinoline |  |  |  |  | 1.0 | 1.0 | 1.0 | 1.1 |

The stocks so compounded were vulcanized in the usual manner by heating for different periods of time in a press at the temperature of 30 pounds of steam pressure per square inch and then artificially aged by heating in an oven at 70° C. for fourteen days. The flex cracking resistance of the vulcanized products was determined, both before and after aging, by means of a flexing machine as set forth by L. V. Cooper, Analytical Edition of Industrial and Engineering Chemistry, vol. 2, No. 4, 1930, pages 391–394. Since the actual number of flexings before failure of a good rubber stock is of the order of several hundred thousand flexes, it is convenient to refer to an arbitrary scale for purposes of relative evaluation. Accordingly, the results are based upon the number 30 for a control stock. While the control stock is not shown it is simply a rubber stock similar to those set forth above containing a standard antioxidant. On this arbitrary scale a difference of one represents a difference of approximately 10,000 flexings. Thus, the figures in the table below are not based upon any particular number of flexings but the differences in the figures do represent differences in the actual number of flexings. Furthermore, the unaged flexing results are based on an unaged control stock and the aged flexing results are based on an aged control stock. Therefore, the aged and unaged results are independent of each other. In other words a higher figure after aging does not necessarily represent a higher number of flexes after aging but indicates that the stock flexed relatively better after aging than did the control stock and therefore showed less deterioration in this respect. Each stock was flexed until visible cracking and checking appeared. The flexing figures therefore show the differences in the number of flexings between the control stock and the test stocks after all stocks have deteriorated to the same extent.

| Stock | Flexing figure | |
|---|---|---|
| | Unaged | Aged 14 days |
| A | 34 | 32 |
| B | 35 | 33 |
| C | 36 | 34 |
| D | 34 | 32 |
| E | 26 | 28 |
| F | 27 | 28 |
| G | 28 | 29 |
| H | 26 | 28 |
| Control | 30 | 30 |

These results show that the addition of as little as 0.05 part by weight of p-chlor diphenyl to a rubber stock increases the number of flexes before failure by approximately 10,000. Higher amounts result in even further improvement. The addition of 0.1 part by weight of p-chlor diphenyl increased the number of flexes in every case, both before and after aging, by approximately 20,000 flexes.

In order to determine the age resistance of the stocks so compounded, they were aged in a bomb at 225° and under 50 pounds air pressure per square inch. The modulus and tensile properties of the aged and unaged rubber products are set forth below:

Table I

| Stock | Cure time in mins. | Hrs. aged | Modulus of elasticity in lbs./in.² at elongations of— | | Tensile at break in lbs./in.² | Ult. elong., percent |
|---|---|---|---|---|---|---|
| | | | 200% | 400% | | |
| A | 60 | 0 | 1,125 | 3,000 | 4,260 | 555 |
| A | 60 | 15 | 1,525 | 3,270 | 3,640 | 470 |
| B | 60 | 0 | 1,080 | 3,050 | 4,300 | 560 |
| B | 60 | 15 | 1,505 | 3,210 | 3,855 | 490 |
| C | 60 | 0 | 1,110 | 2,980 | 4,360 | 570 |
| C | 60 | 15 | 1,485 | 3,300 | 3,810 | 470 |
| D | 60 | 0 | 1,140 | 2,960 | 4,300 | 530 |
| D | 60 | 15 | 1,455 | 3,275 | 3,715 | 465 |
| E | 60 | 0 | 1,135 | 3,040 | 4,350 | 540 |
| E | 60 | 15 | 1,515 | 3,320 | 3,550 | 430 |
| F | 60 | 0 | 1,160 | 3,080 | 4,250 | 530 |
| F | 60 | 15 | 1,435 | 3,280 | 3,280 | 400 |
| G | 60 | 0 | 1,160 | 3,120 | 4,540 | 550 |
| G | 60 | 15 | 1,505 | 3,420 | 3,420 | 400 |
| H | 60 | 0 | 1,150 | 3,100 | 4,620 | 540 |
| H | 60 | 15 | 1,420 | 3,325 | 3,440 | 410 |

The above data show the desirable aging properties of rubber stocks containing the preferred class of materials.

The preferred class of materials can be used to replace part of the antioxidant normally used in a rubber composition without sacrificing the age resistance and at the same time improving the flex cracking resistance. As further specific embodiments of the invention illustrating this application of the new materials, but again without limiting the invention, rubber stocks were compounded comprising

| | Stock | | | | | |
|---|---|---|---|---|---|---|
| | J | K | L | M | N | O |
| | Parts by weight | Parts by weight | Parts by weight | Parts by weight | Parts by weight | Parts by weight |
| Smoked sheets rubber | 100 | 100 | 100 | 100 | 100 | 100 |
| Carbon black | 50 | 50 | 50 | 50 | 50 | 50 |
| Zinc oxide | 5 | 5 | 5 | 5 | 5 | 5 |
| Sulfur | 3 | 3 | 3 | 3 | 3 | 3 |
| Pine tar | 2 | 2 | 2 | 2 | 2 | 2 |
| Stearic acid | 3 | 3 | 3 | 3 | 3 | 3 |
| Mercaptobenzothiazole | 0.75 | 0.75 | 0.75 | 0.75 | 0.75 | 0.75 |
| Mineral acid rearranged 2,2,4-trimethyl dihydroquinoline | 1.0 | 0.9 | | | | |
| p-Chlor diphenyl | | 0.1 | | 0.1 | | 0.15 |
| Condensation product of p-amino diphenyl-acetone | | | 1.0 | 0.9 | 1.5 | 1.35 |

The stocks so compounded were vulcanized by heating for different periods of time in a press at the temperature of thirty pounds of steam pressure per square inch and artificially aged by heating in an oven at 70° C. for seven days. The resistance to flexing was then determined as described above.

| Stock | Flexing figure | |
|---|---|---|
| | Unaged | Aged 7 days |
| J | 26 | 28 |
| K | 28 | 30 |
| L | 34 | 34 |
| M | 36 | 36 |
| N | 36 | 36 |
| O | 38 | 38 |
| Control | 30 | 30 |

Representative stocks were artificially aged in a bomb at 225° C. and under 50 pounds air pressure per square inch.

Table II

| Stock | Cure time in minutes | Hours aged | Modulus of elasticity in lbs./in.² at elongations of— | | Tensile at break in lbs./in.² | Ult. elong., per cent |
|---|---|---|---|---|---|---|
| | | | 200% | 400% | | |
| J | 60 | 0 | 1,255 | 3,105 | 3,840 | 490 |
| J | 60 | 15 | 1,355 | 3,195 | 3,500 | 415 |
| K | 60 | 0 | 1,230 | 3,090 | 3,860 | 510 |
| K | 60 | 15 | 1,320 | 3,160 | 3,570 | 450 |
| N | 60 | 0 | 1,050 | 2,955 | 4,550 | 585 |
| N | 60 | 15 | 1,375 | 3,225 | 3,900 | 510 |
| O | 60 | 0 | 1,075 | 2,980 | 4,620 | 580 |
| O | 60 | 15 | 1,400 | 3,220 | 3,930 | 510 |

These results show replacement of part of the antioxidant by the preferred class of materials has provided rubber compositions of excellent resistance to aging.

Obviously practice of this invention is not limited to the specific compositions given above. The preferred class of materials may be employed in different proportions than herein described and in conjunction with other rubber compositions than those specifically disclosed, for this invention is applicable generally to pure rubber or rubber compositions of the most varied nature. The amount of treating agent, however, is always small with respect to the rubber. That is to say the amount is insufficient to alter or diminish the rubbery properties, particularly the elasticity and modulus and tensile strength.

It is to be understood that the term "treating" as employed in the appended claims is used in a generic sense to include either the incorporating of the preferred class of materials into the rubber by milling or similar process, or their addition to the rubber latex before its coagulation, or the application thereof to the surface of a mass of crude or vulcanized rubber. The term "a rubber" is employed in the claims to define a vulcanizable plastic material which possesses high extensibility under load coupled with the property of forcibly retracting to approximately its original size and shape after the load is removed. Such products include, for example, india rubber, reclaimed rubber, balata, gutta percha and other natural or synthetic vulcanizable products which deteriorate upon aging whether or not admixed with fillers, pigments or accelerating agents.

The present invention is limited solely by the claims attached hereto as part of the present specification.

What is claimed is:

1. The method of improving the physical properties of a rubber which comprises treating a rubber with a chlor diphenyl unsubstituted except for chlorine in an amount not exceeding 0.2 percent by weight on the rubber.

2. The method of improving the physical properties of a rubber which comprises treating a rubber with mono chlor diphenyl unsubstituted except for chlorine in an amount not exceeding 0.2 percent by weight on the rubber.

3. The method of improving the physical properties of a rubber which comprises treating a rubber with p-chlor diphenyl in an amount not exceeding 0.2 percent by weight on the rubber.

4. The method of improving the phyhical properties of natural rubber which comprises treating natural rubber with a mono chlor diphenyl unsubstituted except for chlorine in an amount not exceeding 0.2 percent by weight on the rubber.

5. The method of improving the physical properties of natural rubber which comprises treating natural rubber with p-chlor diphenyl in an amount not exceeding 0.2 percent by weight on the rubber.

6. The method of improving the physical properties of natural rubber which comprises treating natural rubber with a conventional antioxidant in conjunction with p-chlor diphenyl in an amount not exceeding 0.2 percent by weight on the rubber.

7. The method of improving the physical properties of natural rubber which comprises treating natural rubber with a ketone-amine type antioxidant in conjunction with p-chlor diphenyl in an amount not exceeding 0.2 percent by weight on the rubber.

8. The method of improving the physical properties of natural rubber which comprises treating natural rubber with mineral acid rearranged 2,2,4-trimethyl dihydroquinoline in conjunction with about 0.1 percent by weight on the rubber of p-chlor diphenyl.

9. The method of improving the physical properties of natural rubber which comprises treating natural rubber with the condensation product of acetone and p-amino diphenyl in conjunction with about 0.1 percent by weight on the rubber of p-chlor diphenyl.

10. The vulcanized rubber product obtained by heating a rubber and sulfur in the presence of a chlor diphenyl unsubstituted except for chlorine in an amount not exceeding 0.2 percent by weight on the rubber.

11. The vulcanized rubber product obtained by heating a rubber and sulfur in the presence of mono chlor diphenyl unsubstituted except for chlorine in an amount not exceeding 0.2 percent by weight on the rubber.

12. The vulcanized rubber product obtained by heating a rubber and sulfur in the presence of p-chlor diphenyl in an amount not exceeding 0.2 percent by weight on the rubber.

13. The vulcanized rubber product obtained by heating natural rubber and sulfur in the presence of a mono chlor diphenyl unsubstituted except for chlorine in an amount not exceeding 0.2 percent by weight on the rubber.

14. The vulcanized rubber product obtained by heating natural rubber and sulfur in the presence of p-chlor diphenyl in an amount not exceeding 0.2 percent by weight on the rubber.

15. The vulcanized rubber product obtained by heating natural rubber and sulfur in the presence of a conventional rubber antioxidant in conjunction with p-chlor diphenyl in an amount not exceeding 0.2 percent by weight on the rubber.

16. The vulcanized rubber product obtained by heating natural rubber and sulfur in the preseice of a ketone-amine type antioxidant in conjunction with p-chlor diphenyl in an amount not exceeding 0.2 percent by weight on the rubber.

17. The vulcanized rubber product obtained by heating natural rubber and sulfur in the presence of mercaptobenzothiazole and a ketone-amine type antioxidant in conjunction with p-chlor diphenyl in an amount not exceeding 0.2 percent by weight on the rubber.

18. The vulcanized rubber product obtained by heating natural rubber and sulfur in the presence of mineral acid rearranged 2,2,4-trimethyl dihydroquinoline in conjunction with about 0.1 percent by weight of the rubber of p-chlor diphenyl.

19. The vulcanized rubber product obtained by heating natural rubber and sulfur in the presence of the condensation product of acetone and p-amino diphenyl in conjunction with about 0.1 percent by weight on the rubber of p-chlor diphenyl.

ROBERT L. SIBLEY.